United States Patent
Woundy et al.

(10) Patent No.: US 8,144,594 B2
(45) Date of Patent: Mar. 27, 2012

(54) CONGESTION MANAGEMENT IN A SHARED NETWORK

(75) Inventors: Richard Woundy, North Reading, MA (US); Jason Livingood, Philadelphia, PA (US); Chris Bastian, Glenmoore, PA (US); Thomas E. Klieber, Malvern, PA (US); James Cary Mills, II, Tampa, FL (US); Matthew J. Scully, Media, PA (US); Peter J. Sevcik, Charlottesville, VA (US); John Reed Bartlett, Acton, MA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 322 days.

(21) Appl. No.: 12/410,661

(22) Filed: Mar. 25, 2009

(65) Prior Publication Data

US 2010/0246401 A1    Sep. 30, 2010

(51) Int. Cl.
  *G01R 31/08* (2006.01)
(52) U.S. Cl. ........ 370/236; 370/231; 370/232; 370/252; 709/226; 709/232
(58) Field of Classification Search .................. None
  See application file for complete search history.

(56) References Cited

U.S. PATENT DOCUMENTS

| | | | |
|---|---|---|---|
| 6,917,622 | B2 | 7/2005 | McKinnon, III et al. |
| 6,993,044 | B2 | 1/2006 | McKinnon, III et al. |
| 7,009,992 | B2 | 3/2006 | McKinnon, III et al. |
| 7,274,667 | B2 | 9/2007 | McKinnon, III et al. |
| 7,299,284 | B2 | 11/2007 | McKinnon, III et al. |
| 7,512,176 | B1 * | 3/2009 | Beser ........................ 375/222 |
| 2005/0052992 | A1 * | 3/2005 | Cloonan et al. .............. 370/229 |
| 2009/0265468 | A1 * | 10/2009 | Annambhotla et al. ...... 709/226 |
| 2010/0103820 | A1 * | 4/2010 | Fuller et al. ................. 370/236 |

* cited by examiner

*Primary Examiner* — Kibrom T Hailu
(74) *Attorney, Agent, or Firm* — Banner & Witcoff, Ltd.

(57) ABSTRACT

A shared channel used to communicate between a cable modem termination system and multiple cable modems is managed to prevent and/or reduce the impact of congestion. If the average channel utilization is above a near-congestion threshold, a cable modem in an extended high consumption state is assigned a reduced data transmission priority for managed traffic. Priority for that cable modem is restored to a default preferred level when the channel usage by that cable modem drops below a predetermined level or when the average aggregate channel utilization by all cable modems drops below the near-congestion threshold.

30 Claims, 6 Drawing Sheets

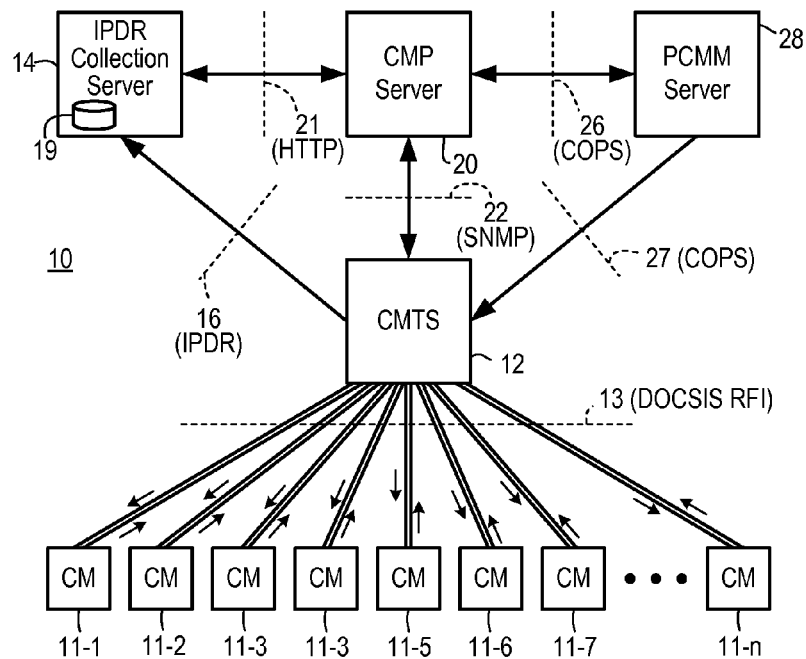

FIG. 1

| | 31 | | | | | | | |
|---|---|---|---|---|---|---|---|---|
| CM | ChanID | BW | DAT_t0 | DAT_t1 | DAT_t2 | DAT_t3 | ••• | DAT_ti |
| 11-1 | A | <Mbps> | <MB> | <MB> | <MB> | <MB> | ••• | <MB> |
| 11-1 | B | <Mbps> | <MB> | <MB> | <MB> | <MB> | ••• | <MB> |
| 11-2 | A | <Mbps> | <MB> | <MB> | <MB> | <MB> | ••• | <MB> |
| 11-2 | B | <Mbps> | <MB> | <MB> | <MB> | <MB> | ••• | <MB> |
| 11-3 | A | <Mbps> | <MB> | <MB> | <MB> | <MB> | ••• | <MB> |
| 11-3 | C | <Mbps> | <MB> | <MB> | <MB> | <MB> | ••• | <MB> |
| 11-4 | A | <Mbps> | <MB> | <MB> | <MB> | <MB> | ••• | <MB> |
| 11-4 | C | <Mbps> | <MB> | <MB> | <MB> | <MB> | ••• | <MB> |
| 11-5 | A | <Mbps> | <MB> | <MB> | <MB> | <MB> | ••• | <MB> |
| 11-5 | C | <Mbps> | <MB> | <MB> | <MB> | <MB> | ••• | <MB> |
| ⋮ | ⋮ | ⋮ | ⋮ | ⋮ | ⋮ | ⋮ | ⋱ | ⋮ |
| 11-n | D | <Mbps> | <MB> | <MB> | <MB> | <MB> | ••• | <MB> |
| 11-n | C | <Mbps> | <MB> | <MB> | <MB> | <MB> | ••• | <MB> |

CONGESTION MANAGEMENT IN A SHARED NETWORK

BACKGROUND

Data network operators face ever-increasing demands from users. For example, various telecommunications operators provide High-Speed Internet (HSI) service to subscribing customers. The number of HSI customers is growing, and many customers are using HSI service for longer periods and/or for more purposes. Although many operators have systems with very substantial capacity, network bandwidth remains a finite resource that must be shared among numerous subscribers. If one subscriber consumes a substantial amount of bandwidth during a period of network congestion, that subscriber can prevent other subscribers from accessing the network or may otherwise cause degradation of the service provided to those other subscribers. As but one example, a Cable Modem Termination System (CMTS) or other network element may provide HSI service to multiple groups of subscribers. Within a subscriber group served by that CMTS through a common channel, one or two subscribers may attempt to transmit very large files over prolonged periods. The other subscribers in the group, who may significantly outnumber the one or two subscribers sending large files, may only need to send small amounts of data at infrequent intervals. If the one or two subscribers sending large files do so at a time when the network is already congested, the remaining subscribers may experience service-impacting delays. The delayed subscribers will likely find this objectionable, particularly if they and the large-file-transmitting subscribers pay the same price for HSI service.

In the above example, the network operator does not wish to prevent subscribers from sending large files. However, the operator does want to minimize the effect such transmissions may have on other subscribers during times of peak network traffic. In this and in other circumstances, there remains a need for methods and systems that fairly allocate network access among multiple users of shared network resources.

SUMMARY

This Summary is provided to introduce a selection of concepts in a simplified form that are further described below in the Detailed Description. This Summary is not intended to identify key features or essential features of the invention.

According to some embodiments, a shared channel used to communicate between a first network device such as a Cable Modem Termination System (CMTS) and multiple second network devices such as cable modems is monitored and managed to prevent and/or reduce congestion. The average utilization of that channel for communications between the first network device and all of the second network devices over a preceding P minute period is analyzed and compared to the total information-carrying capacity of the channel. If the average channel utilization is above a near-congestion threshold, second network devices that are in an Extended High Consumption (EHC) state are assigned a reduced priority for data transmission on the channel. In at least some embodiments, a second network device is in an EHC state if the average data transmission rate to or from that second network device during the preceding P minutes exceeds a predetermined percentage of a provisioned bandwidth of that second network device. As to each of those EHC-state second network devices, priority is restored to a default preferred level when average channel utilization drops below the near-congestion threshold or when the usage of the channel by the second network device drops below a predetermined level.

BRIEF DESCRIPTION OF THE DRAWINGS

Some embodiments of the present invention are illustrated by way of example, and not by way of limitation, in the figures of the accompanying drawings and in which like reference numerals refer to similar elements.

FIG. 1 is a block diagram of a portion of a network implementing congestion management in accordance with certain embodiments.

FIG. 2 is an example of a table stored in an Internet Protocol Detail Record server according to at least some embodiments.

DETAILED DESCRIPTION

Figure 3:
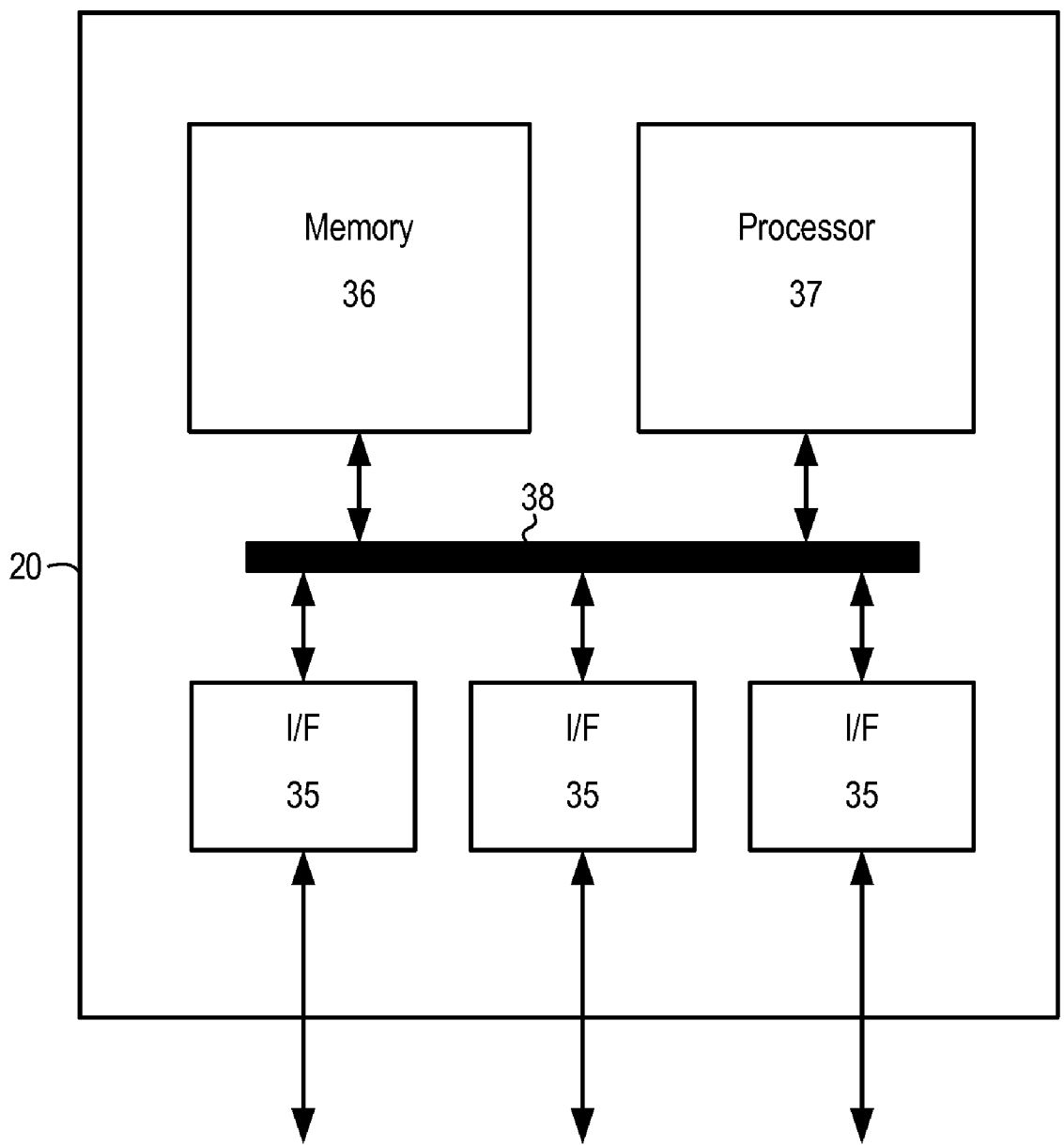
FIG. 3 is a partially schematic block diagram showing a Congestion Management Policy server according to at least some embodiments.

Some embodiments of the invention are described in the context of a High-Speed Internet (HSI) data service provided to subscribers over an access network utilizing communication protocols described in one or more Data-Over-Cable Service Interface Specifications (DOCSIS) standards. Said standards are known in the art and available from Cable Television Laboratories, Inc. (CableLabs®) of Louisville, Colo. However, the invention is not limited to networks using a specific type of communication protocol or a specific physical communication medium.

FIG. 1 is a block diagram of a portion of a network 10 implementing congestion management procedures in accordance with certain embodiments. Each of multiple subscribers communicates with network 10 using a cable modem (CM) located at the subscriber premises. Each of those cable modems, numbered 11-1 through 11-n for convenience, is connected to network 10 by a coaxial cable. Although not shown in FIG. 1, cable modems 11-1 through 11-n are connected with subscriber devices (e.g., personal computers) that utilize those cable modems to send and receive data. Cable modems 11-1 through 11-n are conventional, commercially-available DOCSIS-compliant modems.

Each of cable modems 11-1 through 11-n communicates with a cable modem termination system (CMTS) 12 across interface 13 of a DOCSIS Radio Frequency Interface (DOCSIS RFI) network. CMTS 12 forwards upstream data from cable modems 11-1 through 11-n to other locations in network 10 or to other networks (e.g., the Internet). CMTS 12 also receives data from other locations in network 10 or from other networks and forwards that data to appropriate ones of cable modems 11-1 through 11-n. CMTS 12 is a conventional, commercially available CMTS that receives instructions causing it to operate in the manner described below.

Although each of cable modems 11-1 through 11-n is connected to network 10 through a single coaxial cable attached to the cable modem, the cable modem simultaneously communicates with CMTS 12 in multiple frequency channels. For example, CMTS 12 assigns each of the cable modems one or more downstream frequency channels over which the cable modem is to receive data transmissions from CMTS 12. In some cases, all of those cable modems may be assigned the same downstream frequency channel(s), while in other cases different subsets of those cable modems may be assigned to different downstream channel(s). CMTS 12 also assigns each cable modem one or more upstream frequency channels over which the cable modem is to transmit data to CMTS 12. Again, all of those cable modems may be assigned the same upstream frequency channel(s), or different subsets of those cable modems may be assigned to different upstream channel(s). In some embodiments, downstream channels are located in 6 MHz sub-bands above 91 MHz and upstream channels are located in 1.6, 3.2 or 6.4 MHz sub-bands below 42 MHz. The presence of separate upstream and downstream channels is represented in FIG. 1 as two lines connecting each cable modem with CMTS 12, but any of cable modems 11-1 through 11-n may be assigned multiple upstream and/or downstream channels. Moreover, and as explained in more detail in connection with FIG. 2, individual ones of cable modems 11-1 through 11-n may be assigned to different combinations of frequency channels.

Also shown in FIG. 1 is an Internet Protocol Detail Record (IPDR) collection server 14. IPDR collection server 14 continuously collects data from CMTS 12 over IPDR interface 16. The information collected by IPDR server 14 includes information about the amount of upstream and downstream data communications by each of cable modems 11-1 through 11-n. In at least some embodiments, IPDR collection server 14 maintains a database 19 storing data such as is contained in table 31 of FIG. 2. Table 31 is presented so as to conveniently illustrate the types of data maintained by IPDR server 14 in at least some embodiments. The actual format of data and of the tables or other data structures used to organize that data will vary among different embodiments. In FIG. 2, numerous fields are populated with an angle-bracketed expression (e.g., "<Mbps>," "<MB>"). Such expressions merely indicate, in a generic manner, the type of information that is contained in a particular field.

The first column of table 31, labeled "CM," includes fields for identifiers of all cable modems serviced by CMTS 12. The second column of table 31, labeled "ChanID," includes a field for each cable modem that stores an identifier for a channel of CMTS 12 that is currently serving the cable modem. In most cases, a cable modem may have entries in at least two rows of table 31. For example, one row would contain an identifier for a cable modem in the CM column and an identifier for an upstream channel in the ChanID column, while another row would contain the same cable modem identifier in the CM column and an identifier for a downstream channel in the ChanID column. For purposes of illustration, capital letters ("A," "B," etc.) are used as identifiers for specific channels in the ChanID column of table 31. As seen in FIG. 2, different sub-sets of cable modems 11-1 through 11-n are assigned different combinations of upstream and downstream channels. For example, cable modems 11-1 and 11-2 are assigned upstream channel A and downstream channel B and cable modems 11-3 through 11-5 are assigned upstream channel A and downstream channel C. Thus, cable modems 11-1 through 11-5 must all share the upstream bandwidth of channel A. Cable modems 11-1 and 11-2 share the downstream bandwidth of channel B, while cable modems 11-2 through 11-3 (and 11-n) share the downstream bandwidth of channel C.

The third column of table 31 is labeled "BW" and includes a field, for each cable modem and channel combination, storing a value corresponding to the provisioned bandwidth for that cable modem on that channel. As used herein, "bandwidth" refers to a data transmission rate or capacity measured in units of data (e.g., megabytes (MB) or megabits (Mb)) per unit of time (e.g., seconds). In some embodiments, cable modems have different provisioned bandwidths on upstream and downstream channels. Moreover, some cable modems may have different provisioned bandwidths in the upstream and/or downstream directions as compared to other cable modems. In some systems, for example, a subscriber with basic HSI service is allowed to download data at first rate (e.g., 6 megabits per second (Mbps)). For an additional fee, an HSI service subscriber is allowed to download data at a higher rate (e.g., 8 Mbps). A system operator may similarly allow basic HSI service subscribers to transmit upstream data at a first rate (e.g., 1 Mbps) and allow other subscribers paying higher fees to transmit upstream data at a higher rate (e.g., 2 Mbps). In at least some embodiments, cable modems 11-1 through 11-n obtain a boot file from the provisioning system and register with CMTS 12. CMTS 12 communicates the provisioned bandwidth of cable modems 11-1 through 11-n to IPDR server 14.

In some implementations, the provisioned bandwidth may only limit the channel usage of a cable modem with regard to certain types of data. For example, a system operator may configure network 10 so that a particular subscriber is allowed to consume up to 6 Mbps of downstream channel capacity for download of generic Internet data such as web pages, web downloads and email. The operator may further allow the user to consume up to 1 Mbps of upstream channel capacity for email, web surfing, generic file uploads, etc. However, the system operator may impose no bandwidth restrictions as to data associated with other types of traffic. Examples of such other types of data could include voice traffic that may utilize internet protocol (IP) but be transmitted over networks other than the Internet ("non-Internet digital voice traffic") and system management messages.

The fourth column of table 31 is labeled "DAT_t0." For rows of table 31 in which ChanID corresponds to an upstream channel, the DAT_t0 field stores a value for the aggregate number of managed data megabytes received by CMTS 12 on that channel, in an immediately preceding period having a duration of t, from the cable modem identified on the same row. As used herein, "managed data" refers to data for which the congestion management algorithms described herein are used to manage network congestion associated with communication of that data. In at least some embodiments, user data traffic corresponding to generic Internet usage such as email, web surfing and web downloads is managed data traffic subject to the congestion management procedures described herein. In these embodiments, other types of data traffic between CMTS 12 and cable modems 11-1 through 11-n (e.g., non-Internet digital voice traffic and system management messages) is assigned to service flows that are not affected by the procedures described herein. However, those other types of data traffic may be congestion-managed according to additional procedures that occur in parallel with procedures described herein.

Returning to table 31, t is one minute in some embodiments, and the DAT_t0 field stores a value for the total number of managed data megabytes sent by a cable modem on a particular channel in the last minute. For rows of table 31 in which ChanID corresponds to a downstream channel, the DAT_t0 field stores a value for the aggregate number of managed data megabytes sent by CMTS 12 on that channel, in an immediately preceding period of duration t, to the cable modem identified on the same row. The fifth and subsequent columns of table 31 are labeled "DAT_t1" through "DAT_ti" and contain fields storing values for the total managed data MB sent to or received from a particular cable modem, on a particular channel, in prior periods of duration t. For example, the first row of table 31 may, at a point in time just after 4:00, have a value in the DAT_t0 field representing the aggregate number of managed data megabytes sent upstream from cable modem 11-1 on channel A from 3:59 to 4:00, have a value in the DAT_t1 field representing the aggregate number of managed data megabytes sent upstream from cable modem 11-1 on channel A from 3:58 to 3:59, etc. Thus, the aggregate number of managed data megabytes sent to (or received from) a cable modem on a particular channel in the preceding P minutes can be determined by summing the values in the DAT_t0 through DAT_t(P-1) fields on the row corresponding to that cable modem and channel.

Returning to FIG. 1, IPDR server 14 collects and stores managed data traffic information. In some embodiments, IPDR server 14 receives information that has been formatted in accordance with the IPDR Interface Information Specifications (available from the TM Forum of Morristown, N.J.) and/or the DOCSIS Operations Support System Interface Specification (available from CableLabs®) and then stores that information in any convenient format. Other embodiments may utilize servers that receive and store similar information using different protocols and/or formats. Although not shown in FIG. 1, IPDR server 14 includes one or more processors and communication interfaces through which those processors cause data and instructions to be exchanged with CMTS 12 and Congestion Management Policy (CMP) server 20, which is described below. IPDR server 14 also includes one or more types of volatile and non-volatile memory used to store data (including that described in connection with table 31) and instructions.

Managed data channel usage information for cable modems 11-1 through 11-n in database 19 is accessed by CMP server 20. In some embodiments, CMP server 20 retrieves information from IPDR server 14 over a hypertext transfer protocol (HTTP) interface 21. CMP server 20 also exchanges information with CMTS 12 using a Simple Network Management Protocol (SNMP) interface 22. Specifically, CMP server 20 periodically queries CMTS 12 to determine the percentage of capacity that is currently being utilized on each upstream and downstream channel of CMTS 12. Although IPDR server 14 stores information reflecting the amount of managed data sent by individual cable modems in individual channels in discrete time periods, information reflecting overall usage of a particular channel is obtained from CMTS 12. The overall usage of a channel will include the combined usage of that channel, by all cable modems assigned to that channel, to send (if the channel is an upstream channel) or receive (if the channel is a downstream channel) managed data. However, the overall channel usage will also include contributions corresponding to other types of data (e.g., non-Internet digital voice traffic and system management messages) for which usage information may not be stored in IPDR server 14, or may be counted separately from Internet traffic. As also discussed in more detail below, CMP server 20 communicates with PacketCable Multimedia (PCMM) policy server 28 over a Common Open Policy Service (COPS) interface 26.

FIG. 3 is a block diagram showing, in partially schematic form, hardware for CMP server 20 according to at least some embodiments. CMP server 20 includes one or more hardware interfaces 35 that provide physical connections to network 10 over which CMP server 20 communicates with IDPR server 14, CMTS 12, PCMM server 28 and other network elements. In at least some embodiments, hardware interfaces 35 include one or more Ethernet cards. CMP server 20 further includes memory 36 for storing instructions and data and a processor 37 for executing instructions and controlling operation of CMP server 20. Although a single block is shown for memory 36 and a single block shown for processor 37, memory and computational operations of CMP server 20 could respectively be distributed across multiple memory devices and multiple processors located within CMP server 20 and/or across memory and processors located on multiple platforms. Memory 36 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 37 may be implemented with any of numerous types of devices, including but not limited to one or more general purpose microprocessors, one or more application specific integrated circuits, one or more field programmable gate arrays, and combinations thereof. In at least some embodiments, processor 37 carries out operations described in herein according to machine readable instructions stored in memory 36 and/or stored as hardwired logic gates within processor 37. Processor 37 communicates with and controls memory 36 and interfaces 35 over one or more buses 38.

Returning to FIG. 1, PCMM policy server 28 receives communications from CMP server 20 over COPS interface 26 and communicates instructions to CMTS 12 over a COPS interface 27. PCMM policy servers are well-known in the art and are described, e.g., in the PacketCable Multimedia Specification PKT-SP-MM-I03-051221 available from Cable Television Laboratories, Inc. (CableLabs®) of Louisville, Colo. Several operations of PCMM server 28 in the embodiment of FIG. 1 are further described below.

Figure 4A:
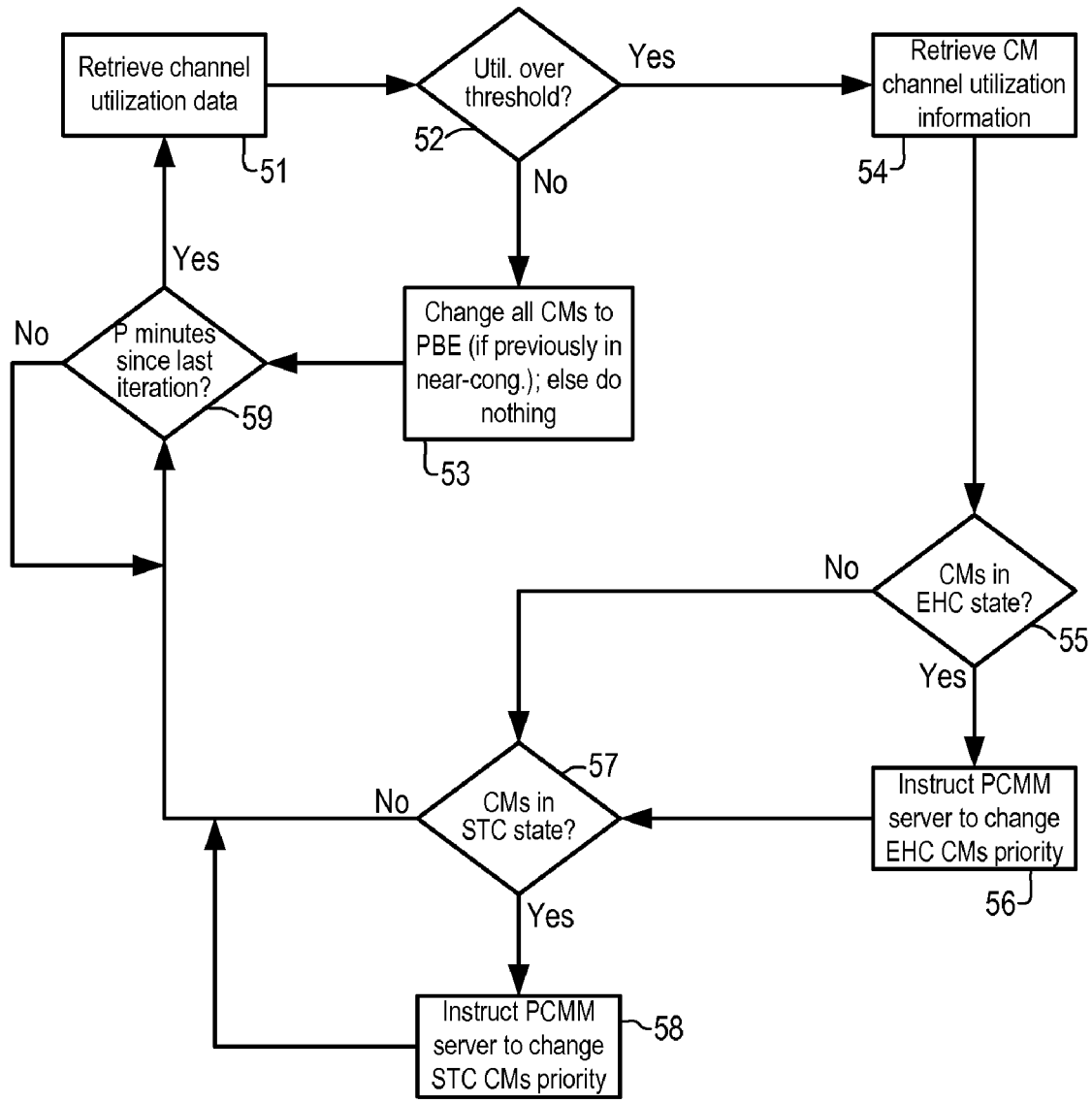
FIG. 4A is a state diagram explaining operation of a Congestion Management Policy server, according to at least some embodiments, to manage data flows during periods of network congestion.

FIG. 4A is a state diagram explaining operation of CMP server 20, according to at least some embodiments, to control managed data flows in network 10 so as to reduce and/or prevent impact from network congestion. The algorithm of FIG. 4A is carried out by processor 37 of CMP server 20 according to instructions stored in memory 36 as executable code and/or according to hardwired logic instructions within processor 37. For purposes of illustration, the algorithm of FIG. 4A will be described by reference to a single downstream channel. Specifically, the FIG. 4A algorithm will be described by reference to communications on a single downstream frequency channel over which CMTS 12 transmits data (managed data and other data types) to some subset of cable modems 11-1 through 11-n. A separate instance of the algorithm would be performed for an upstream channel. In at least some embodiments, CMP server 20 simultaneously executes multiple instances of the algorithm of FIG. 4A in separate program threads. Each of those instances corresponds to a single upstream or downstream frequency channel between CMTS 12 and one or more of cable modems 11-1 through 11-n. If, for example, CMTS 12 transmits downstream data to cable modems 11-1 through 11-n (or subsets thereof) over four frequency channels and receives upstream data from those cable modems over two frequency channels, CMP server 12 will execute six simultaneous instances of the FIG. 4A algorithm. An "iteration" of the algorithm of FIG. 4A begins, and a previous iteration ends, at the transition from block 59 to block 51.

Beginning in block 51 of FIG. 4A, CMP server 20 sends an SNMP inquiry to CMTS 12 over SNMP interface 22. That inquiry requests information by which CMP server 20 can determine the overall utilization (i.e., average data flow in Mbps), during the immediately prior period having duration of P minutes, of a specific channel of CMTS 12 for all communications on that channel. As explained above, such communications can include managed data sent to cable modems assigned to that channel. Such communications may also include data traffic that is not tracked by IPDR server 14 and/or otherwise not managed by the congestion management algorithm of FIG. 4A (e.g., non-Internet digital voice traffic and system management messages). For convenience, the specific CMTS channel for which an instance of the FIG. 4A algorithm is being performed is hereinafter referred to as "the channel of interest." In some embodiments, the information provided to CMP server 20 by CMTS 12 may include the total amount of data that passed through the channel of interest during the preceding P minutes or over consecutive preceding periods that total P minutes. CMP server 20 can then calculate overall utilization of that channel in Mbps by multiplying the value for the total amount of data (in MB) by 8 Mb/MB and then dividing by (P min*60 s/min). In other embodiments, CMTS 12 may calculate its overall utilization per channel over one or more time periods and simply provide that calculation to CMP server 20. P is 15 minutes in some embodiments, but other values of P may be used.

CMP server 20 then continues to block 52 and determines if the channel of interest is in a near-congestion state. In some embodiments, an upstream channel is in a near-congestion state if the overall CMTS utilization of that channel exceeds 70% of the channel's maximum capacity (i.e., 70% of the channel's maximum bandwidth), and a downstream channel is in a near-congestion state if the overall CMTS utilization of that channel exceeds 80% of the channel's maximum capacity (i.e., 80% of the channel's maximum bandwidth). By way of illustration, a downstream channel of a CMTS may have a capacity of 38 Mbps. If the overall utilization of that channel in the previous P minutes exceeds 30.4 Mbps, the channel is in a near-congestion state.

Other near-congestion thresholds are used in other embodiments. For example, the upstream channel near-congestion threshold could be set at some other percentage between, e.g., 60% and 90% of maximum channel capacity and the downstream channel near-congestion threshold could be some other percentage between, e.g., 60% and 90%. In some embodiments, upstream thresholds are different from downstream thresholds, though this need not be the case.

If the channel is not in a near-congestion state, i.e., if the overall utilization of the channel for communications with all cable modems (and any other devices) assigned to that channel is less than the threshold percentage of capacity, CMP server 20 proceeds to block 53. Block 53 is described in more detail below. If the channel is in a near-congestion state, however, CMP server 20 proceeds to block 54.

In block 54, CMP server 20 sends an HTTP inquiry to IPDR server 14 requesting the identities of all cable modems being served by CMTS 12 on the channel of interest, as well as the aggregate amount of managed data sent to each of those cable modems in the immediately preceding P minute period. If the channel of interest was an upstream channel, the information obtained by CMP server 20 from IPDR server 14 would instead include the aggregate amount of managed data received from each of those cable modems in the immediately preceding P minute period. CMP server 20 also obtains the provisioned bandwidth for each of the cable modems on the channel of interest (the value for BW in table 31 of FIG. 2). CMP server 20 then proceeds to block 55 and determines, for each of the cable modems identified in block 54, if that cable modem is in an Extended High Consumption (EHC) state. In some embodiments, CMP server 20 makes this determination by first calculating the average managed data channel usage by the cable modem in the preceding P minutes according to $$\text{AvUsage(CM,ChanID)} = [\text{Total(CM,ChanID)} * (8 \text{ Mb/MB})]/(P \min * 60 \text{ s/min}).$$

In this formula, "AvUsage(CM,ChanID)" is the average managed data channel usage of the cable modem having identifier "CM" and using the channel having identifier "ChanID"; in the present example, "ChanID" is the channel identifier for the channel of interest. "Total(CM,ChanID)" is the total managed data sent to the cable modem having the same identifier "CM" and using the same channel (i.e., the channel of interest). If the channel of interest was an upstream channel, "Total(CM,ChanID)" would be the total managed data received from the cable modem having identifier "CM." After calculating a cable modem's average managed data usage of the channel of interest in the preceding P minutes, CMP server 20 classifies that cable modem as in an EHC state if that average managed data channel usage is above a first threshold percentage of the provisioned bandwidth for that cable modem on that channel. In some embodiments, that first threshold percentage is 70%, and a cable modem is in an EHC state if AvUsage(CM,ChanID)>0.70*BW.

By way of illustration, a cable modem with a provisioned bandwidth of 8 Mbps would be in an EHC state if its average managed data channel usage was above 5.6 Mbps, while another cable modem using the same channel but having a provisioned bandwidth of 6 Mbps would be in an EHC state if its average managed data channel usage was above 4.2 Mbps. Other thresholds could be used to determine whether a cable modem is in an EHC state. For example, the EHC threshold could be set at some other percentage between, e.g., 60% and 90% of the cable modem's provisioned bandwidth. In some embodiments, upstream thresholds are different from downstream thresholds, though this need not be the case.

If none of the cable modems using the channel of interest is found to be in an EHC state, CMP server 20 continues on the "No" branch to block 57, which block is described below. Otherwise, CMP server 20 proceeds to block 56. In block 56, CMP server 20 sends an instruction to PCMM server 28 across COPS interface 26. In particular, CMP server 20 instructs PCMM server 28 to alter the queuing priority for EHC-state cable modems identified in block 55. In response, PCMM server 28 sends a PCMM Gate-Set request message to CMTS 12 across COPS interface 27. In response to this Gate-Set request from PCMM server 28, CMTS 12 changes the queuing priority of the cable modems in an EHC state on the channel of interest from a first priority to a second priority and sends notifications of same to those cable modems.

In at least some embodiments, the first priority level is a Preferred Best Effort (PBE) priority level and the second priority level is a Best Effort (BE) priority level. In some such embodiments, all cable modems have a PBE priority assignment by default. During periods of near congestion on a channel, cable modems in an EHC state are assigned a BE priority on that channel. With regard to a downstream channel, managed data for cable modems assigned BE priority is transmitted by CMTS 12 after managed data for cable modems assigned PBE priority. In one implementation, this is achieved by dividing transmission on the channel into 2 millisecond intervals. In each of those intervals, all PBE-queued managed data is first transmitted. After all PBE-queued managed data is transmitted, BE-queued managed data is transmitted in the remainder of the two millisecond interval. If all PBE-queued managed data cannot be transmitted in a particular 2 millisecond interval, no BE-queued managed data will be transmitted during that interval. With regard to upstream channels, CMTS 12 assigns upstream transmission opportunities to cable modems such that PBE priority cable modems are permitted to transmit managed data on the channel during the first part of each two millisecond interval and BE priority cable modems are permitted to transmit managed data in the remaining portions (if any) of those two millisecond intervals.

In some embodiments, CMTS 12 changes the queuing priority of each of cable modems 11-1 through 11-$n$ to BE and sends notifications of same to those cable modems. CMTS 12 uses the DOCSIS priority (PBE or BE) in its decisions to grant upstream transmission opportunities to cable modems.

CMP server 20 proceeds from block 56 to block 57. In block 57, CMP server 20 re-evaluates the queuing priority for each cable modem using the channel of interest with a BE priority assignment and which received that BE priority in a previous iteration of the FIG. 4A algorithm. If the current iteration relates to a period from 3:45 to 4:00, for example, CMP server 20 would re-evaluate the queuing priority of all cable modems on the channel of interest that were assigned BE priority at the conclusion of the period from 3:30 to 3:45. In block 57, CMP server 20 first excludes all cable modems on the channel that were identified in block 55 during the current iteration of the FIG. 4A algorithm. CMP server 20 next analyzes the information, obtained in block 54 of the current iteration, to determine which of the remaining BE-priority cable modems are in a Sub-Threshold Consumption (STC) state. CMP server 20 makes this determination by first calculating the average managed data channel usage (AvUsage(CM,ChanID)), for each of the remaining cable modems assigned BE priority, using the formula described above in connection with block 55. CMP server 20 then classifies a cable modem as in a STC state if its average managed data channel usage is below a second threshold percentage of the provisioned bandwidth for that cable modem on the channel of interest. In some embodiments, that second threshold percentage is 50%, and a cable modem is in a STC state if AvUsage(CM,ChanID)<0.50*BW, where "BW" is the provisioned bandwidth of the cable modem on the channel of interest.

In at least some embodiments, different thresholds are used for EHC and STC state determinations so as to provide a hysteresis that prevents a cable modem from being repeatedly re-classified because of a relatively small change in managed data channel usage by that cable modem. Other thresholds could be used to determine whether a cable modem is in an STC state. For example, the STC threshold could be set at some other percentage between, e.g., 30% and 80% of the cable modem's provisioned bandwidth.

If none of the BE-priority cable modems using the channel of interest are in a STC state, CMP server 20 continues on the "No" branch to block 59. Block 59 is described below. Otherwise, CMP server 20 proceeds to block 58 and sends an instruction to PCMM server 28 across COPS interface 26. In particular, CMP server 20 instructs PCMM server 28 to alter the queuing priority for the STC-state cable modems identified in block 57. In response, PCMM server 28 sends a PCMM Gate-Set request message to CMTS 12 across COPS interface 27. In response to this Gate-Set request from PCMM server 28, CMTS 12 changes the queuing priority of those cable modems back to PBE and sends notifications of same to those cable modems.

From block 58, or on the "No" branch from block 57, CMP server 20 proceeds to block 59. In block 59, CMP server 20 recursively determines if P minutes have elapsed since the current algorithm iteration began. If not, CMP server 20 loops back to block 59 on the "No" branch. Otherwise, CMP server 20 proceeds to block 51 on the "Yes" branch and begins the next iteration.

Returning to block 52, if CMP server 20 determines that the channel of interest is not in a near-congestion state, CMP server 20 proceeds to block 53 on the "No" branch. If the channel of interest was in a near-congestion state at the end of the previous algorithm iteration, CMP server 20 sends an instruction to PCMM server 28 over COPS interface 26 to set any cable modems on the channel in the second priority (e.g., BE) to the first priority (e.g., PBE), in response to which PCMM server 28 sends the appropriate Gate-Set request messages to CMTS 12. CMP server 20 then proceeds to block 59. If the channel of interest was not in a near-congestion state in the previous algorithm iteration, all cable modems using the channel will already have the first priority level (e.g., PBE priority), and CMP server 20 proceeds to block 59 without taking any additional action.

Figure 4B:
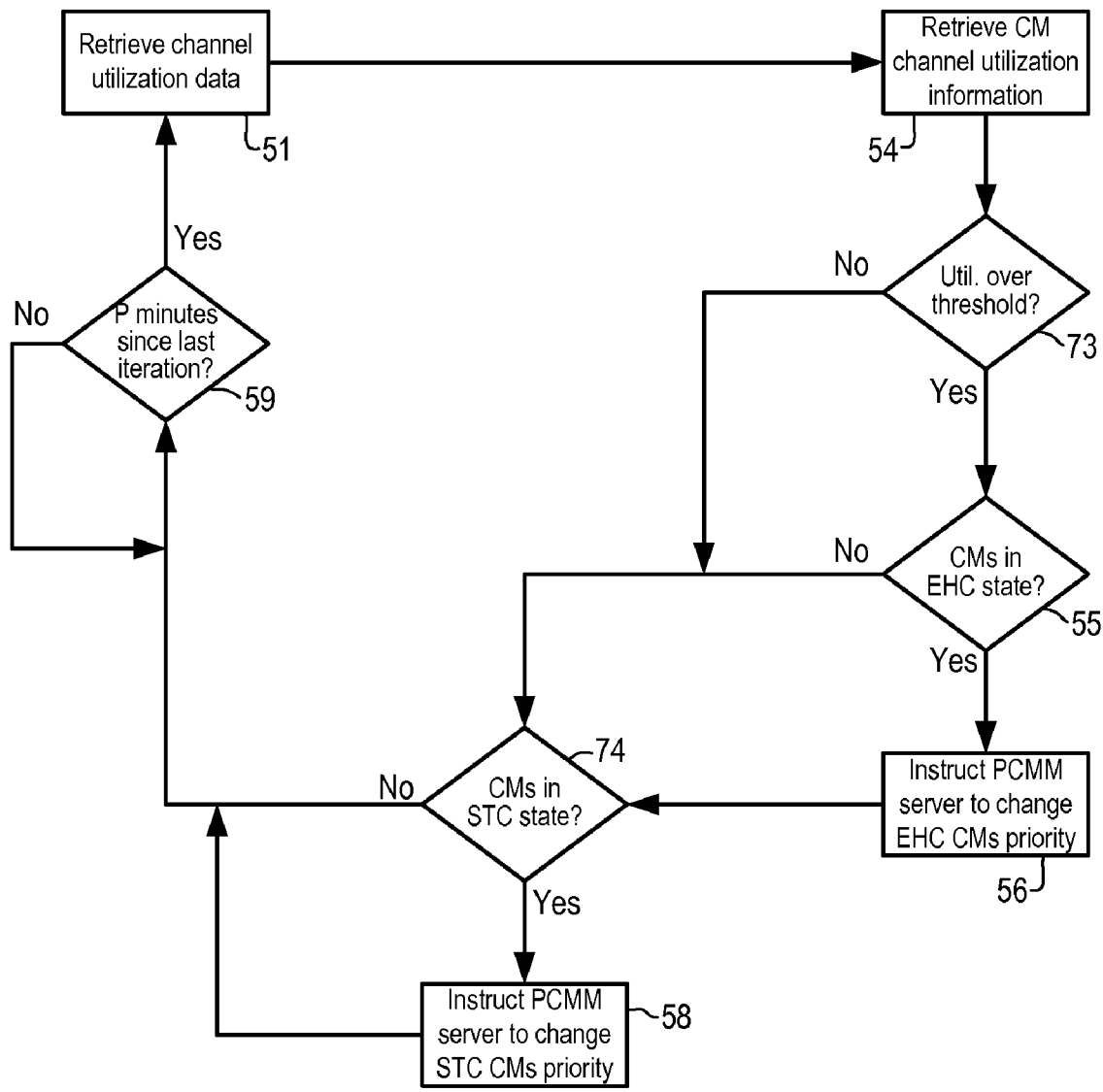
FIG. 4B is a state diagram explaining operation of a Congestion Management Policy server, according to at least some additional embodiments, to manage data flows during periods of network congestion.

In some embodiments, the algorithm of FIG. 4A is slightly modified so that cable modems assigned a second (e.g., BE) priority are not automatically returned to the first priority (e.g., PBE) when the channel of interest is no longer in a near-congestion state. Instead, a cable modem assigned the second priority are not returned to first priority until that cable modem is in the STC state. One example of such an algorithm is shown in FIG. 4B. The operations in blocks 51, 54-56, 58 and 59 in the algorithm of FIG. 4B are same as the operations in blocks 51, 54-56, 58 and 59, respectively, in the algorithm of FIG. 4A. The operation in block 73 of FIG. 4B is the same as the operation of block 52 of FIG. 4A, except that it occurs after block 54, and except that the "No" branch from block 73 proceeds directly to block 74. The operation of block 74 of FIG. 4B is the same as the operation of block 57 of FIG. 4A, except that CMP server 20 does not first exclude cable modems identified in block 55 during the current iteration if block 74 is reached directly on the "No" branch from block 73.

Figure 5:
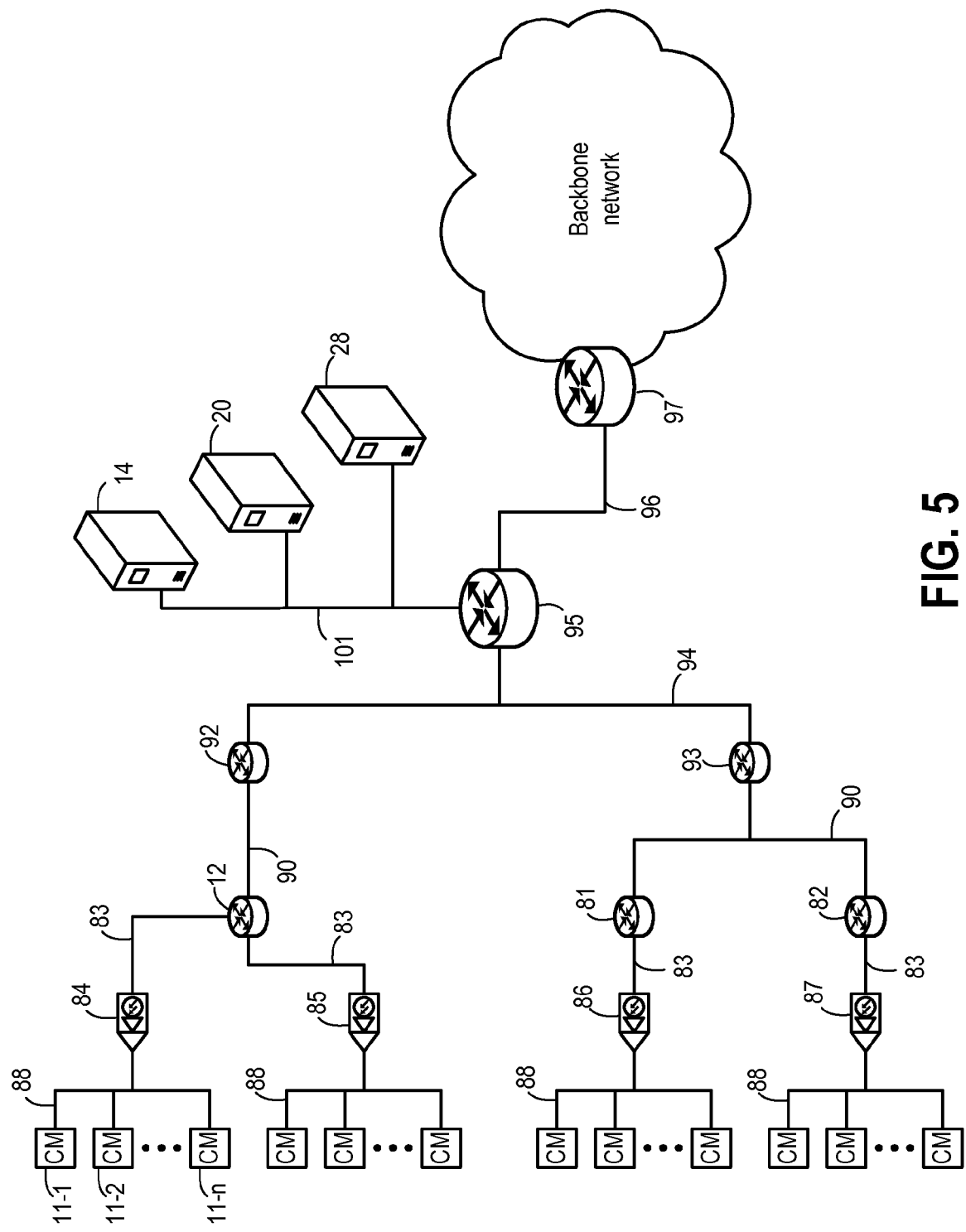
FIG. 5 is a diagram showing integration of a Congestion Management Policy server into a larger network topology according to at least some embodiments.

FIG. 5 is a diagram showing integration of CMP server 20 into a larger network topology according to at least some embodiments. CMTS 12 and CMTSs 81 and 82 communicate over optical fibers 83 to optical nodes 84 through 87, with each node communicating with subscriber cable modems over coaxial cables 88. Cable modems communicating through nodes 85 through 87 are not separately numbered in FIG. 5, but congestion in channels between those cable modems and their respective CMTSs is managed in a manner similar to that described above. The CMTSs communicate over optical fibers 90 with local market routers 92 and 93, with those local market routers communicating over optical fibers 94 with a regional network router 95. Regional router 95 communicates over optical fiber 96 with an internet backbone router 97. IPDR server 14, CMP server 20 and PCMM server 28 communicate with regional router 95 over Gigabit Ethernet links 101 and serve CMTSs 12, 81 and 82. IPDR server 14 may actually comprise multiple servers, as may CMP server 20 and PCMM server 28. Numerous additional routers, CMTSs, optical nodes and cable modems can also be included.

Other embodiments include numerous variations on the algorithm of FIG. 4A and/or the algorithm of FIG. 4B. Different thresholds can be used to determine whether a cable modem is in an EHC or STC state. The period P could have other durations (e.g., a value between 5 and 30 minutes), and/or the duration of monitoring period P could vary from iteration to iteration of a congestion management algorithm. The period used to determine if a CMTS channel is in a near-congestion state need not be the same as the period used to determine the consumption state (EHC, STC or otherwise) of cable modems using that channel. One set of thresholds and monitoring period(s) can be used for one CMTS channel while a different set of thresholds and monitoring period(s) is simultaneously used for a different channel. More than two priority levels could be employed. For example, a cable modem could be assigned a first reduced priority when the cable modem initially enters an EHC state and be assigned a second (further) reduced priority after remaining in an EHC state for an extended amount of time.

Figure 6:
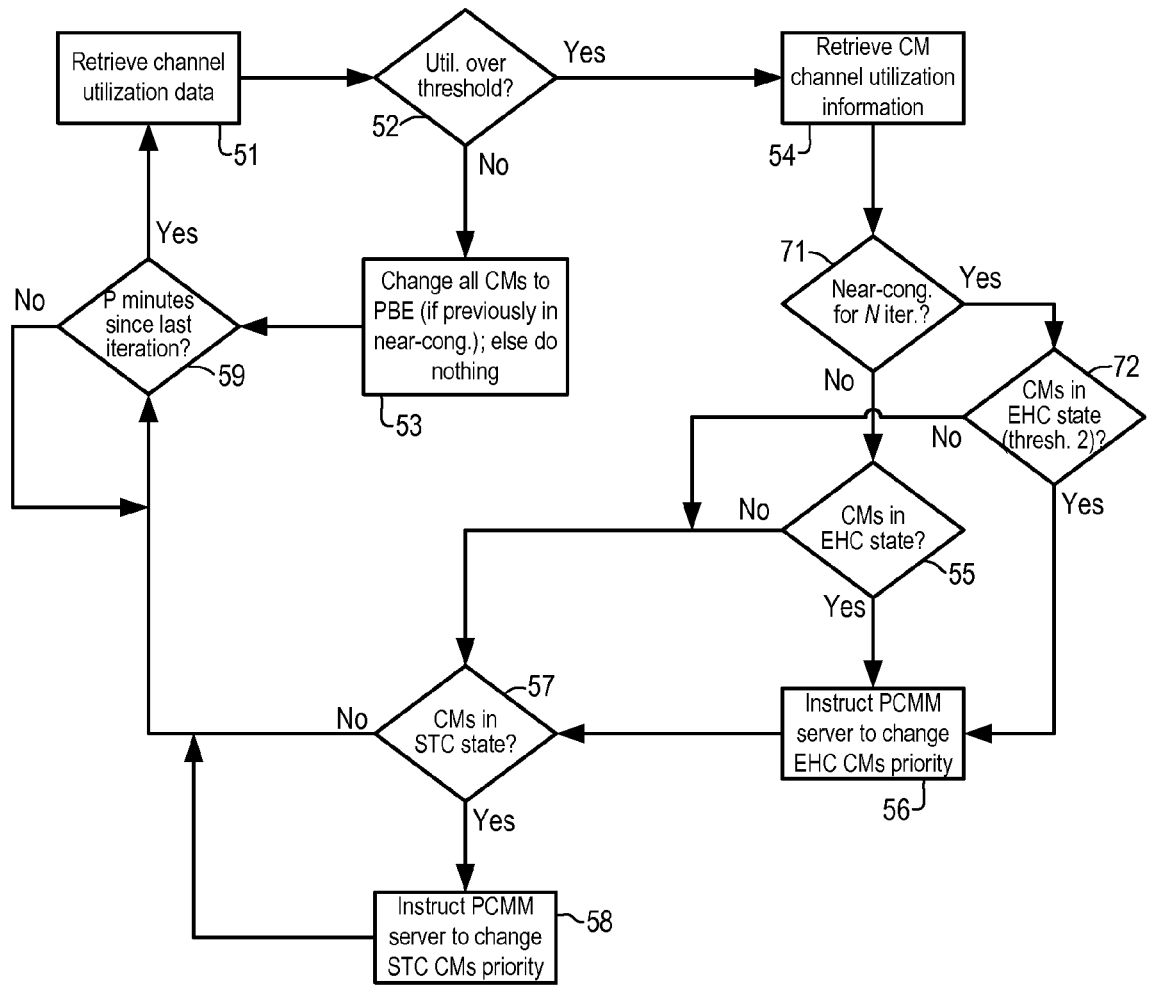
FIG. 6 is a state diagram explaining operation of a Congestion Management Policy server, according to at least some additional embodiments, to manage data flows during periods of network congestion.

In some embodiments, monitoring periods and/or classification thresholds can be adaptive and can change from iteration to iteration of a congestion management algorithm. One example of such an algorithm is shown in FIG. 6. The operations in blocks 51 through 59 in the algorithm of FIG. 6 are same as the operations in blocks 51 through 59, respectively, in the algorithm of FIG. 4A. In the FIG. 6 algorithm, however, CMP server 20 proceeds from block 54 to block 71 and determines if the channel of interest has been in a near-congestion state for N previous iterations of the algorithm (where N is 1, 2, 3, or some other preselected value). If the channel of interest has not been in a near-congestion state for at least N previous iterations, CMP server proceeds on the "No" branch to block 55 and continues as described in connection with FIG. 4A. If the channel of interest has been in a near-congestion state for at least N previous iterations, CMP server instead proceeds on the "Yes" branch to block 72. The operations of block 72 are similar to those of block 55 of FIG. 4A, except that a different threshold is used to classify a cable modem as in an EHC state. For example, a cable modem could be classified as in an EHC state in block 72 if AvUsage (CM,ChanID)>0.60*BW, where "BW" is the provisioned bandwidth of the cable modem on the channel of interest. From block 72, CMP server 20 proceeds to block 56. The algorithm of FIG. 6 could be further modified so that the STC state threshold is also reduced if the channel of interest has been in a near-congestion state for at least N consecutive iterations (e.g., STC=TRUE if AvUsage(CM,ChanID) <0.40*BW).

In still other embodiments, the operation of block 55 in the FIG. 4A algorithm and/or FIG. 4B algorithm is modified so that a cable modem is only classified as in an EHC state if its average managed data usage of a channel has been at a first level for a first period and at a second level for a second period. For example, CMP server 20 could be configured to only classify a cable modem as in an EHC state if its average managed data channel usage during a first immediately preceding period of duration P1 is a first percentage K1 of its provisioned bandwidth and if its average managed data channel usage during a second immediately preceding period of duration P2 is a second percentage K2 of its provisioned bandwidth, with P2>P1 and K1>K2. To further illustrate this example, assume P2=30 minutes, P1=15 minutes, K1=75%, K2=65%, a cable modem has a provisioned bandwidth of 6 Mbps, and its consumption state is being evaluated immediately after 4:00. The cable modem would only be classified as in an EHC state if its average managed data channel consumption from 3:45 to 4:00 was over 4.5 Mbps and its average managed data channel consumption from 3:30 to 4:00 was over 3.9 Mbps.

In some embodiments, operations performed by CMP server 20, IPDR server 14, PCMM server 28 and/or CMTS 12 in the above described embodiments are allocated differently. For example, all of those operations could be performed within a modified CMTS. As another example, the above described operations of IPDR server 14 could be performed by CMP server 20. As yet another embodiment, PCMM server 28 might be omitted, with CMP server 20 directly instructing CMTS 12 over SNMP interface 22 to set priorities for particular cable modems on particular channels.

In still other embodiments, the congestion management procedures described above are performed by a CMP server in a different type of network using different communication protocols and/or communicating with devices over a physical communication medium other than coaxial cable. For example, the above described congestion management procedures could be used in a Passive Optical Network (PON) utilizing one of various available PON protocols. In such an embodiment, communications among a first network device (e.g., an Optical Line Terminal) and multiple second network devices (e.g., Optical Network Terminals) on a common channel corresponding to a particular light wavelength may be managed to avoid or reduce congestion. As another example, a first network device may be a wireless router in a wireless access network, and the second communication devices may be wireless mobile terminals operating in accordance with any of various wireless access protocols.

Although various embodiments were described in connection with a CMTS (a first network device) communicating with multiple modems (second network devices) over a shared frequency channel, other embodiments include management of other types of channels. As indicated above, a common "channel" may be formed by a particular light wavelength in an optical communication system. As another example, a first network device may communicate with a group of second network device in a channel that comprises a recurring time slot, but in which the communications occur in different frequencies at different times (e.g., a frequency-hopping scheme).

Embodiments of the invention include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a server or other network device to carry out operations such as are described herein. As used herein (including the claims), a machine-readable storage medium is a physical structure that can be touched by a human. A modulated signal would not by itself constitute a machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and computer program products. Any and all permutations of features from above-described embodiments are the within the scope of the invention.

The invention claimed is:

1. A method comprising:

determining a first channel over which a first network device communicates with multiple second network devices of a first group is in a first state, wherein the first state corresponds to utilization of an information-carrying capacity of the first channel above a first threshold level over a first time period;

identifying one or more second network devices of the first group that have consumed the information-carrying capacity of the first channel above a second threshold level over a second time period;

generating an instruction to cause communications between the first network device and the identified second network devices to change from a first priority to a second priority while the first channel is in the first state, wherein the second priority is lower than the first priority; and generating a subsequent instruction to cause communications between the first network device and a subsequently-identified one of the identified second network devices to change from the second priority to the first priority in response to determining the subsequently-identified second network device to have consumed the information-carrying capacity of the first channel below a third threshold level over a third time period, wherein the third threshold is lower than the second threshold.

2. The method of claim 1, further comprising:

generating an instruction to cause restoration of the priority for communications between the first network device and the identified second network devices from the second priority to the first priority when the first channel is no longer in the first state.

3. The method of claim 1, wherein the first network device simultaneously communicates over the first channel with the second network devices of the first group and communicates over a second channel with multiple second network devices in a second group, wherein the first channel is different from the second channel, and further comprising:

determining the second channel is in a second state, wherein the second state corresponds to utilization of an information-carrying capacity of the second channel above a fourth threshold level over a fourth time period;

identifying one or more second network devices of the second group that have consumed the information-carrying capacity of the second channel above a fifth threshold level over a fifth time period; and generating an instruction to cause communications between the first network device and the identified second network devices of the second group to change from a third priority to a fourth priority while the second channel is in the second state, wherein the fourth priority is lower than the third priority.

4. The method of claim 3, wherein at least some of the second network devices in the first group are also members of the second group, the first channel is only used to communicate data from the first network device to the second network devices of the first group, the second channel is only used to receive data at the first network device from the second network devices in the second group, and the first threshold level and the fourth threshold level are different.

5. The method of claim 4, wherein the first network device is a cable modem termination system, the second network devices are cable modems, each of the second network devices of the first group has a provisioned downstream bandwidth corresponding to a maximum rate at which the second network device is permitted to receive data from the cable modem termination system, and the second threshold is, as to each of the second network devices of the first group, less than 100% of the provisioned downstream bandwidth for the second network device.

6. The method of claim 5, wherein the second threshold is, as to each of the second network devices of the first group, between 60% and 90% of the provisioned downstream bandwidth for the second network device.

7. The method of claim 5, wherein each of the first, second, third, fourth, and fifth time periods has a duration of between 5 and 30 minutes.

8. The method of claim 1, wherein the first priority corresponds to a first queue and the second priority level corresponds to a second queue, data is communicated over the first shared channel in consecutive time intervals of a predetermined duration, and within each time interval, all data in the first queue is transmitted before data in the second queue.

9. The method of claim 1, further comprising:

subsequent to the generating an instruction, determining the first channel has remained in the first state for a predetermined period of time;

identifying one or more second network devices of the first group that have consumed the information-carrying capacity of the first channel above a reduced second threshold level over another second time period, wherein the reduced second threshold level is less than the second threshold level; and generating an instruction to cause communications between the first network device and the identified second network devices consuming first channel information-carrying capacity above the reduced second threshold level to change from a first priority to a second priority while the first shared channel remains in the first state.

10. The method of claim 1, wherein the second threshold is a first percentage of the provisioned bandwidth for the identified one or more second network devices of the first group, and the third threshold is a second percentage of the provisioned bandwidth for the identified one or more second network devices of the first group, wherein the second percentage is lower than the first percentage.

11. The method of claim 1, wherein the second and third time periods are the same.

12. The method of claim 1, wherein the second and third time periods are the same as each other, but different from the first time period.

13. A machine-readable storage medium storing machine-executable instructions for performing a method comprising:

determining a first channel over which a first network device communicates with multiple second network devices of a first group is in a first state, wherein the first state corresponds to utilization of an information-carrying capacity of the first channel above a first threshold level over a first time period;

identifying one or more second network devices of the first group that have consumed the information-carrying capacity of the first channel above a second threshold level over a second time period;

generating an instruction to cause communications between the first network device and the identified second network devices to change from a first priority to a second priority while the first channel is in the first state, wherein the second priority is lower than the first priority; and generating a subsequent instruction to cause communications between the first network device and a subsequently-identified one of the identified second network devices to change from the second priority to the first priority in response to determining the subsequently-identified second network device to have consumed the information-carrying capacity of the first channel below a third threshold level over a third time period, wherein the third threshold is lower than the second threshold.

14. The machine-readable storage medium of claim 13, storing further machine-executable instructions for performing:

generating an instruction to cause restoration of the priority for communications between the first network device and the identified second network devices from the second priority to the first priority when the first channel is no longer in the first state.

15. The machine-readable storage medium of claim 13, wherein the first network device simultaneously communicates over the first channel with the second network devices of the first group and communicates over a second channel with multiple second network devices in a second group, wherein the first channel is different from the second channel, and storing further machine-executable instructions for performing:

determining the second channel is in a second state, wherein the second state corresponds to utilization of an information-carrying capacity of the second channel above a fourth threshold level over a fourth time period;

identifying one or more second network devices of the second group that have consumed the information-carrying capacity of the second channel above a fifth threshold level over a fifth time period; and generating an instruction to cause communications between the first network device and the identified second network devices of the second group to change from a third priority to a fourth priority while the second channel is in the second state, wherein the fourth priority is lower than the third priority.

16. The machine-readable storage medium of claim 15, wherein at least some of the second network devices in the first group are also members of the second group, the first channel is only used to communicate data from the first network device to the second network devices of the first group, the second channel is only used to receive data at the first network device from the second network devices in the second group, and the first threshold level and the fourth threshold level are different.

17. The machine-readable storage medium of claim 16, wherein the first network device is a cable modem termination system, the second network devices are cable modems, each of the second network devices of the first group has a provisioned downstream bandwidth corresponding to a maximum rate at which the second network device is permitted to receive data from the cable modem termination system, and the second threshold is, as to each of the second network devices of the first group, less than 100% of the provisioned downstream bandwidth for the second network device.

18. The machine-readable storage medium of claim 17, wherein the second threshold is, as to each of the second network devices of the first group, between 60% and 90% of the provisioned downstream bandwidth for the second network device.

19. The machine-readable storage medium of claim 17, wherein each of the first, second, third, fourth, and fifth time periods has a duration of between 5 and 30 minutes.

20. The machine-readable storage medium of claim 13, wherein the first priority corresponds to a first queue and the second priority level corresponds to a second queue, data is communicated over the first shared channel in consecutive time intervals of a predetermined duration, and within each time interval, all data in the first queue is transmitted before data in the second queue.

21. The machine-readable storage medium of claim 13, storing further machine-executable instructions for performing:

subsequent to the generating an instruction, determining the first channel has remained in the first state for a predetermined period of time;

identifying one or more second network devices of the first group that have consumed the information-carrying capacity of the first channel above a reduced second threshold level over another second time period, wherein the reduced second threshold level is less than the second threshold level; and generating an instruction to cause communications between the first network device and the identified second network devices consuming first channel information-carrying capacity above the reduced second threshold level to change from a first priority to a second priority while the first shared channel remains in the first state.

22. An apparatus, comprising:

at least one processor; and at least one memory, wherein at least one of the at least one memory and the at least one processor stores instructions executable by the at least one processor to perform operations that include determining a first channel over which a first network device communicates with multiple second network devices of a first group is in a first state, wherein the first state corresponds to utilization of an information-carrying capacity of the first channel above a first threshold level over a first time period, identifying one or more second network devices of the first group that have consumed the information-carrying capacity of the first channel above a second threshold level over a second time period, generating an instruction to cause communications between the first network device and the identified second network devices to change from a first priority to a second priority while the first channel is in the first state, wherein the second priority is lower than the first priority, and generating a subsequent instruction to cause communications between the first network device and a subsequently-identified one of the identified second network devices to change from the second priority to the first priority in response to determining the subsequently-identified second network device to have consumed the information-carrying capacity of the first channel below a third threshold level over a third time period, wherein the third threshold is lower than the second threshold.

23. The apparatus of claim 22, wherein at least one of the at least one memory and the at least one processor stores instructions executable by the at least one processor to perform operations that include generating an instruction to cause restoration of the priority for communications between the first network device and the identified second network devices from the second priority to the first priority when the first channel is no longer in the first state.

24. The apparatus of claim 22, wherein the first network device simultaneously communicates over the first channel with the second network devices of the first group and communicates over a second channel with multiple second network devices in a second group, wherein the first channel is different from the second channel, and wherein at least one of the at least one memory and the at least one processor stores instructions executable by the at least one processor to perform operations that include determining the second channel is in a second state, wherein the second state corresponds to utilization of an information-carrying capacity of the second channel above a fourth threshold level over a fourth time period, identifying one or more second network devices of the second group that have consumed the information-carrying capacity of the second channel above a fifth threshold level over a fifth time period, and generating an instruction to cause communications between the first network device and the identified second network devices of the second group to change from a third priority to a fourth priority while the second channel is in the second state, wherein the fourth priority is lower than the third priority.

25. The apparatus of claim 24, wherein at least some of the second network devices in the first group are also members of the second group, the first channel is only used to communicate data from the first network device to the second network devices of the first group, the second channel is only used to receive data at the first network device from the second network devices in the second group, and the first threshold level and the fourth threshold level are different.

26. The apparatus of claim 25, wherein the first network device is a cable modem termination system, the second network devices are cable modems, each of the second network devices of the first group has a provisioned downstream bandwidth corresponding to a maximum rate at which the second network device is permitted to receive data from the cable modem termination system, and the second threshold is, as to each of the second network devices of the first group, less than 100% of the provisioned downstream bandwidth for the second network device.

27. The apparatus of claim 26, wherein the second threshold is, as to each of the second network devices of the first group, between 60% and 90% of the provisioned downstream bandwidth for the second network device.

28. The apparatus of claim 26, wherein each of the first, second, third, fourth, and fifth time periods has a duration of between 5 and 30 minutes.

29. The apparatus of claim 22, wherein the first priority corresponds to a first queue and the second priority level corresponds to a second queue, data is communicated over the first shared channel in consecutive time intervals of a predetermined duration, and within each time interval, all data in the first queue is transmitted before data in the second queue.

30. The apparatus of claim 24, wherein at least one of the at least one memory and the at least one processor stores instructions executable by the at least one processor to perform operations that include subsequent to the generating an instruction, determining the first channel has remained in the first state for a predetermined period of time, identifying one or more second network devices of the first group that have consumed the information-carrying capacity of the first channel above a reduced second threshold level over another second time period, wherein the reduced second threshold level is less than the second threshold level, and generating an instruction to cause communications between the first network device and the identified second network devices consuming first channel information-carrying capacity above the reduced second threshold level to change from a first priority to a second priority while the first shared channel remains in the first state.

* * * * *